(12) United States Patent
Cern et al.

(10) Patent No.: US 7,148,799 B2
(45) Date of Patent: Dec. 12, 2006

(54) ARRANGEMENT OF DAISY CHAINED INDUCTIVE COUPLERS FOR DATA COMMUNICATION

(75) Inventors: Yehuda Cern, Brookline, MA (US); Ram Rao, Brighton, MA (US)

(73) Assignee: Ambient Corporation, Newton, MA (US)

( * ) Notice: Subject to any disclaimer, the term of this patent is extended or adjusted under 35 U.S.C. 154(b) by 206 days.

(21) Appl. No.: 11/011,574

(22) Filed: Dec. 14, 2004

(65) Prior Publication Data

US 2005/0077868 A1   Apr. 14, 2005

(51) Int. Cl.
*G08B 1/08* (2006.01)
(52) U.S. Cl. .................... 340/538.16; 340/310.17; 307/3; 439/620.05
(58) Field of Classification Search ............. None
See application file for complete search history.

(56) References Cited

U.S. PATENT DOCUMENTS

| | | | | |
|---|---|---|---|---|
| 5,835,005 A * | 11/1998 | Furukawa et al. | .......... | 370/400 |
| 5,949,327 A * | 9/1999 | Brown | .......... | 375/258 |
| 6,144,292 A * | 11/2000 | Brown | .......... | 455/402 |
| 6,927,672 B1 * | 8/2005 | Zalitzky et al. | ........ | 340/310.17 |
| 6,980,089 B1 * | 12/2005 | Kline | .......... | 375/258 |
| 7,046,882 B1 * | 5/2006 | Kline | .......... | 385/100 |

* cited by examiner

*Primary Examiner*—Benjamin C. Lee
(74) *Attorney, Agent, or Firm*—Ohlandt, Greeley, Ruggiero & Perle, LLP

(57) ABSTRACT

There is provided an arrangement of inductive couplers. The arrangement includes a first inductive coupler on a conductor, and a second inductive coupler on the conductor. The first inductive coupler has a first winding for a data signal, and the second inductive coupler has a second winding for the data signal. The arrangement also includes a connection module that connects the first winding to the second winding.

16 Claims, 4 Drawing Sheets

ARRANGEMENT OF DAISY CHAINED INDUCTIVE COUPLERS FOR DATA COMMUNICATION

BACKGROUND OF THE INVENTION

1. Field of the Invention

The present invention relates to data communications. It is particularly suitable for power line communications (PLC) between locations having a common electrical distribution system.

2. Description of the Related Art

PLC, also known as Broadband over Power Line (BoPL), is a technology that encompasses transmission of data at high frequencies through existing electric power lines, i.e., conductors used for carrying a power current. Power current is typically transmitted through power lines at a frequency in the range of 50–60 hertz (Hz). In low voltage lines, power current is transmitted with a voltage between about 90 to 600 volts, and in medium voltage lines, power current is transmitted with a voltage between about 2,400 volts to 35,000 volts. The frequency of the data signals is greater than or equal to about 1 megahertz (MHz), and the voltage of the data signal ranges from a fraction of a volt to a few tens of volts. Data communication can employ various modulation schemes such as amplitude modulation, frequency modulation, pulse modulation or spread spectrum modulation.

An inductive coupler couples PLC signals to and from a power line. The inductive coupler has a high pass frequency characteristic. Therefore, a signal attenuation or path loss through the inductive coupler may be excessive below a lower cutoff frequency of the inductive coupler.

It is desirable to provide for PLC communications over a range of frequencies that extends below a lower cutoff frequency of an inductive coupler.

SUMMARY OF THE INVENTION

There is provided an arrangement of inductive couplers. The arrangement includes a first inductive coupler on a conductor, and a second inductive coupler on the conductor. The first inductive coupler has a first winding for a data signal, and the second inductive coupler has a second winding for the data signal. The arrangement also includes a connection module that connects the first winding to the second winding.

DESCRIPTION OF THE INVENTION

Described herein is a technique for communication over a power line. The technique employs two or more proximal couplers connected electrically in series or parallel with one another.

Generally, an inductive coupler includes a split magnetic core and a winding situated around the core. The core may be configured, for example, with two C-shaped portions. When the two C-shaped portions are placed together, they form a cylinder with an aperture extending through the center of the cylinder. The two C-shaped portions may be separated and placed on an energized or de-energized wire so that the wire is routed through the aperture. The wire may be a power line or other conductor. The wire, the core, and the winding situated around the core, together, form a transformer, where the wire serves as a primary of the transformer and the winding around the core serves as a secondary of the transformer. The secondary may be connected to a modem or other communications equipment directly or via a surge protection circuit.

PLC employs data signal frequencies greater than or equal to about 1 MHz. However, a bandpass of an inductive coupler may have a lower cutoff frequency of greater than 1 MHz, and so, the inductive coupler may not provide adequate performance at signal frequencies down to 1 MHz. Increasing the inductance of a wire passing through the inductive coupler extends the lower cutoff frequency, thus allowing lower signal frequencies to be used for communications. One technique of increasing inductance is increasing a number of magnetic cores in the coupler. The increase in the number of magnetic cores can be accomplished by a coupling together of individual inductive couplers.

Figure 1:
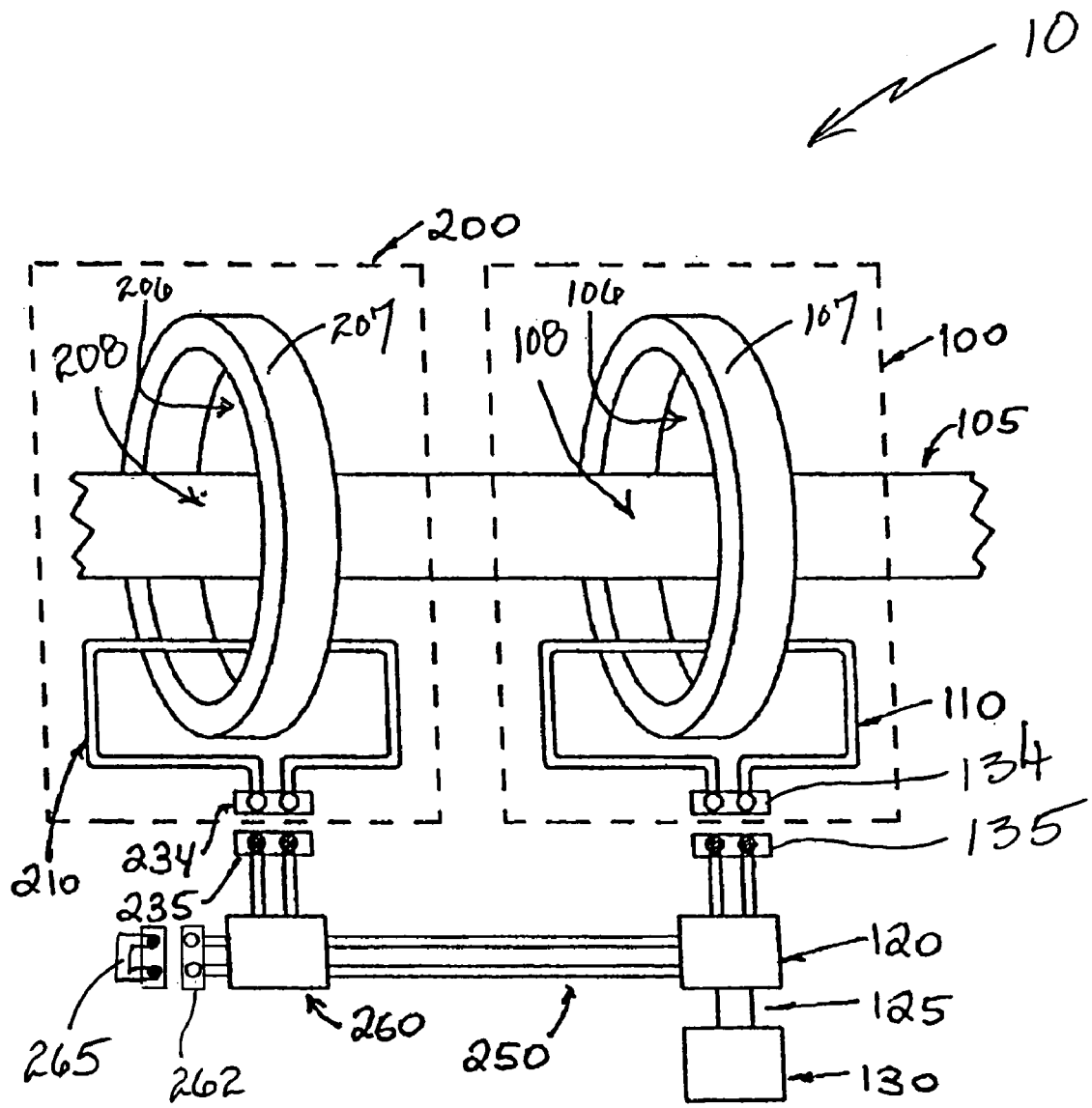
FIG. 1 is a drawing of a circuit having two inductive couplers connected in series.

FIG. 1 is a drawing of a circuit 10 that includes an inductive coupler 100 and an inductive coupler 200 situated on a conductor 105. Conductor 105 may be, for example, a phase conductor of an outside power line, i.e., a power line external to a building.

Inductive coupler 100 includes a core 107 and a winding 110. Inductive coupler 100 is situated on conductor 105 such that conductor 105 is routed through an aperture 106 in core 107. Together, conductor 105, core 107 and winding 110 form a transformer where a portion 108 of conductor 105 serves as a primary of the transformer, and winding 110 serves as a secondary of the transformer. Inductive coupler 100 couples a data signal between conductor 105 and winding 110. Winding 110 is connected via connectors 134 and 135 to a surge protection module 120, which is, in turn, connected via a cable 125 to a modem 130. In a preferred implementation, connector 135 and cable 125 are integral parts of surge protection module 120.

Inductive coupler 200 includes a core 207, and a winding 210. Inductive coupler 200 is situated on conductor 105 such that conductor 105 is routed through an aperture 206 in core 207. Together, conductor 105, core 207 and winding 210 form a transformer, where a portion 208 of conductor 105 serves as a primary of the transformer, and winding 210 serves as a secondary of the transformer. Inductive coupler 200 couples a data signal between conductor 105 and winding 210. Winding 210 is connected via connectors 234 and 235, to a connection module 260. Connection module 260 connects winding 210, via a jumper connection 262 and a jumper 265, to a cable 250, which connects to surge protection module 120.

Figure 2:
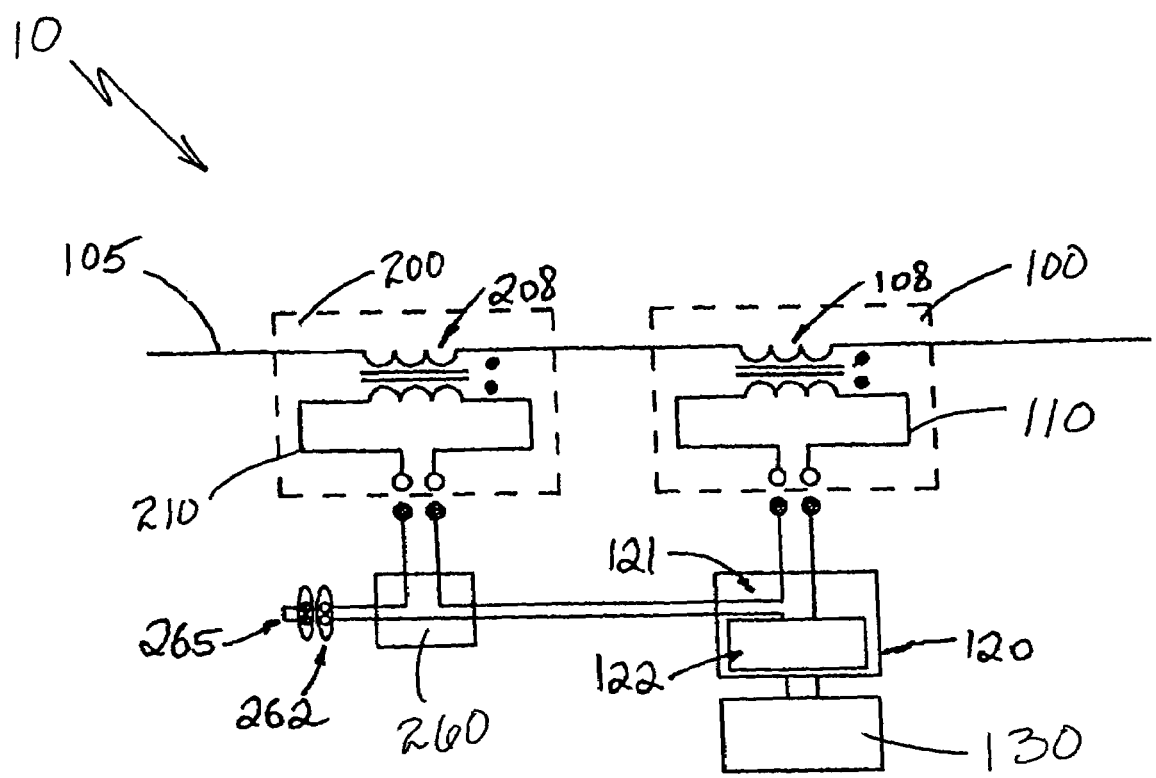
FIG. 2 is a schematic diagram of the circuit of FIG. 1.

FIG. 2 is a schematic diagram of circuit 10. FIG. 2 shows that surge protection module 120 includes a connection section 121 and a surge suppression circuit 122. Connection section 121 connects winding 110 in series with winding 210. Thus, the secondary of inductive coupler 100 is connected in series with the secondary of inductive coupler 200. This connection is arranged such that induced voltages from these secondaries add in the same phase, consistent with the direction of the primary wires, as indicated in FIG. 2B by phasing dots.

Couplers 100 and 200 need not be any particular distance from one another to perform as described herein. However, for best performance, couplers 100 and 200 should be adjacent to each other, and longitudinal separation should not exceed one tenth of a wavelength, at the highest signal frequency in use.

Surge suppression circuit 122 protects modem 130 from voltage that can result from an excessive surge current on conductor 105, such as in a case of a lightening strike on conductor 105. Surge suppression circuit 122 can be implemented, for example, with a gas tube surge arrestor or an avalanche diode surge arrestor.

Figure 3:
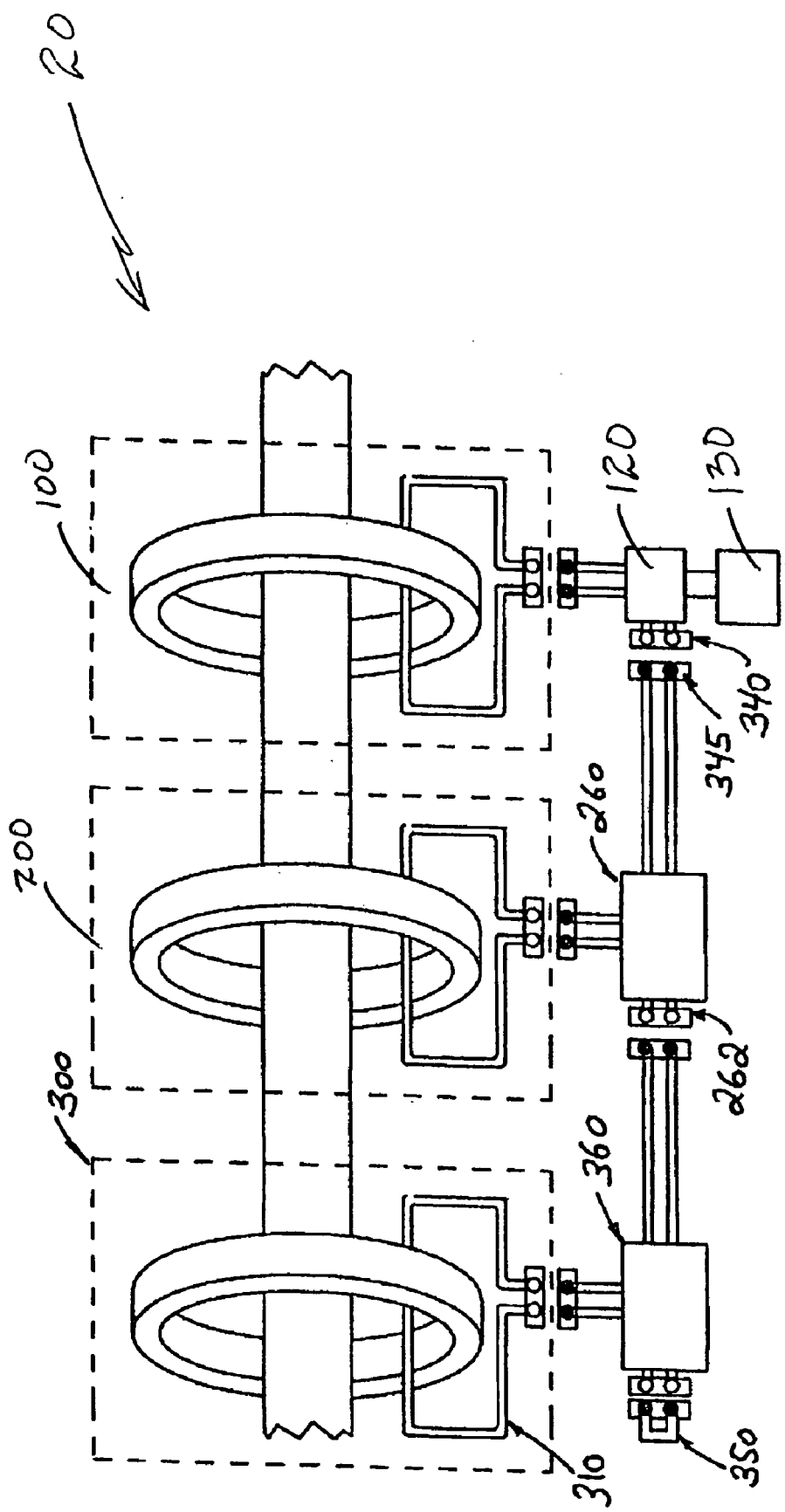
FIG. 3 is a drawing of a circuit having three inductive couplers connected in series.
Figure 4:
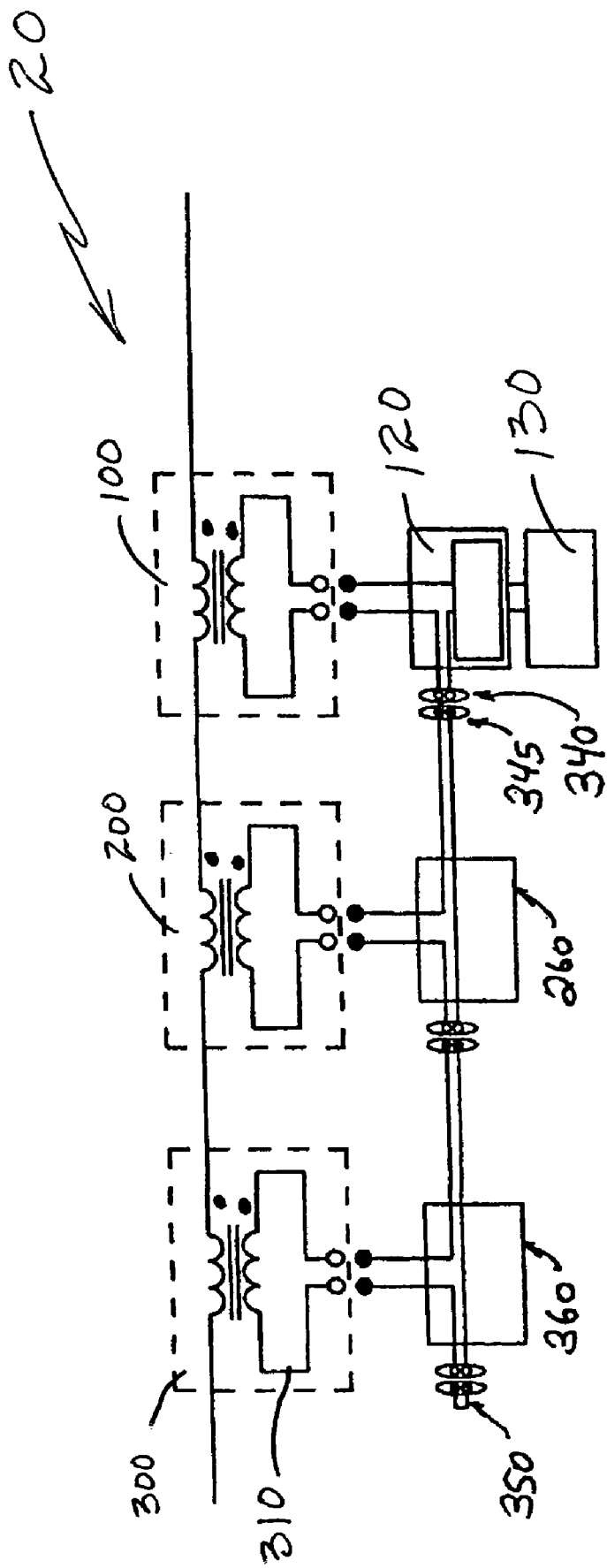
FIG. 4 is a schematic diagram of the circuit of FIG. 3.

FIG. 3 is a drawing of a circuit 20, which is an enhancement of circuit 10. Circuit 20 includes an inductive coupler 300. Inductive coupler 300, similarly to couplers 100 and 200, includes a winding 310 that serves as a secondary of a transformer. FIG. 4 is a schematic diagram of circuit 20.

In circuit 20, in contrast to circuit 10, jumper connection 262 is not jumped, but is instead, connected to winding 310 via a connection module 360. Connection module 360 is terminated by a jumper 350.

A daisy chain is a collection of standardized modules connected to each other in a chain. Typically, an output cable of one module is plugged into an input connector of the next module in the chain. Thus, inductive couplers 100, 200 and 300 are daisy-chained.

The chain of inductive couplers 100, 200 and 300 shares surge suppression circuit 122 (see FIG. 2). Thus, only one surge suppression circuit 122 is required. This arrangement is less expensive than equipping each inductive coupler 100, 200 and 300 with its own surge suppression circuit 122, and may reduce RF signal loss for the aggregate of inductive couplers 100, 200 and 300.

Note that in FIGS. 1 and 2 cable 250 is represented as being hard wired to surge protection module 120 and connection module 260. In contrast, in FIGS. 3 and 4, connections between connection module 260 and surge protection module 120 are made via connectors 340 and 345.

Any number of inductive couplers may be daisy chained. When the inductive couplers are chained via connection modules (e.g., connection modules 260 and 360) the last connection module in the chain (e.g., connection module 360) has its jumper terminals shorted together.

While a series connection of inductive couplers 100, 200 and 300 is illustrated in FIGS. 1–4, a parallel connection may be implemented along the same lines.

What is claimed is:

1. A system comprising:
   a first inductive coupler on a conductor, wherein said first inductive coupler has a first winding for a data signal;
   a second inductive coupler on said conductor, wherein said second inductive coupler has a second winding for said data signal; and
   a connection module that connects said first winding to said second winding.

2. The system of claim 1, wherein said connection module connects said first winding and said second winding to a communications device.

3. The system of claim 1, wherein said connection module connects said first winding and said second winding to a surge suppression circuit.

4. The system of claim 1, wherein said connection module connects said first winding and said second winding in series with one another.

5. The system of claim 1, wherein said connection module connects said first winding and said second winding in parallel with one another.

6. The system of claim 1, wherein said connection module connects said first winding and said second winding in phase with one other.

7. The system of claim 1,
   wherein said conductor is a power line, and
   wherein said data signal has a frequency greater than or equal to about 1 megahertz.

8. The system of claim 1,
   wherein said first inductive coupler couples said data signal between said conductor and said first winding, and
   wherein said second inductive coupler couples said data signal between said conductor and said second winding.

9. A method comprising:
   situating a first inductive coupler on a conductor, wherein said first inductive coupler has a winding for a data signal;
   situating a second inductive couple on said conductor, wherein said second inductive coupler has a winding for said data signal; and
   connecting said winding of said first inductive coupler to said winding of said second inductive coupler.

10. The method of claim 9, wherein said connecting comprises connecting said first winding and said second winding to a communications device.

11. The method of claim 9, wherein said connecting comprises connecting said first winding and said second winding to a surge suppression circuit.

12. The method of claim 9, wherein said connecting comprises connecting said first winding and said second winding in series with one another.

13. The method of claim 9, wherein said connecting comprises connecting said first winding and said second winding in parallel with one another.

14. The method of claim 9, wherein said connecting comprises connecting said first winding and said second winding in phase with one other.

15. The method of claim 9,
   wherein said conductor is a power line, and
   wherein said data signal has a frequency greater than or equal to about 1 megahertz.

16. The method of claim 9,
   wherein said first inductive coupler couples said data signal between said conductor and said first winding, and
   wherein said second inductive coupler couples said data signal between said conductor and said second winding.

* * * * *